United States Patent [19]
Henley

[11] 4,060,149
[45] Nov. 29, 1977

[54] CONVEYER APPARATUS

[76] Inventor: James C. Henley, 7240 S. 7th St., Space C-38, Phoenix, Ariz. 85011

[21] Appl. No.: 742,589

[22] Filed: Nov. 17, 1976

[51] Int. Cl.² .................. F16H 27/02; A63B 27/00
[52] U.S. Cl. ................................. 182/133; 74/89.2
[58] Field of Search ............ 182/141, 133, 128, 187; 74/89.2, 89.22

[56] References Cited

U.S. PATENT DOCUMENTS

| 295,587 | 3/1884 | Sadler | 74/89.2 |
|---|---|---|---|
| 2,859,629 | 11/1958 | Parker | 74/89.22 |
| 3,203,270 | 8/1965 | Booth | 74/89.22 |
| 3,237,720 | 3/1966 | Landquist | 182/133 |

Primary Examiner—Reinaldo P. Machado
Attorney, Agent, or Firm—Cahill, Sutton & Thomas

[57] ABSTRACT

A conveyer produces translation along the longitudinal axis of a cylindrically shaped body. An endless length of cable forms a tightly wrapped coil around the body and includes a loop displaced from the body. A support frame is supported by the terminal windings of the coil and is rotatable about the longitudinal axis of the body. A pulley is mounted on the frame for maintaining the loop in a substantially constant position with respect to the coil while a driving means induces relative rotational motion between the loop and the body about the longitudinal axis of the body. This relative rotational motion winds cable onto one end of the coil while simultaneously unwinding cable from the other end of the coil. The cable is maintained under tension so that the coil is wrapped tightly around the outer surface of the body. In this manner the frame and any load attached to it are conveyed along the longitudinal axis of the body.

10 Claims, 6 Drawing Figures

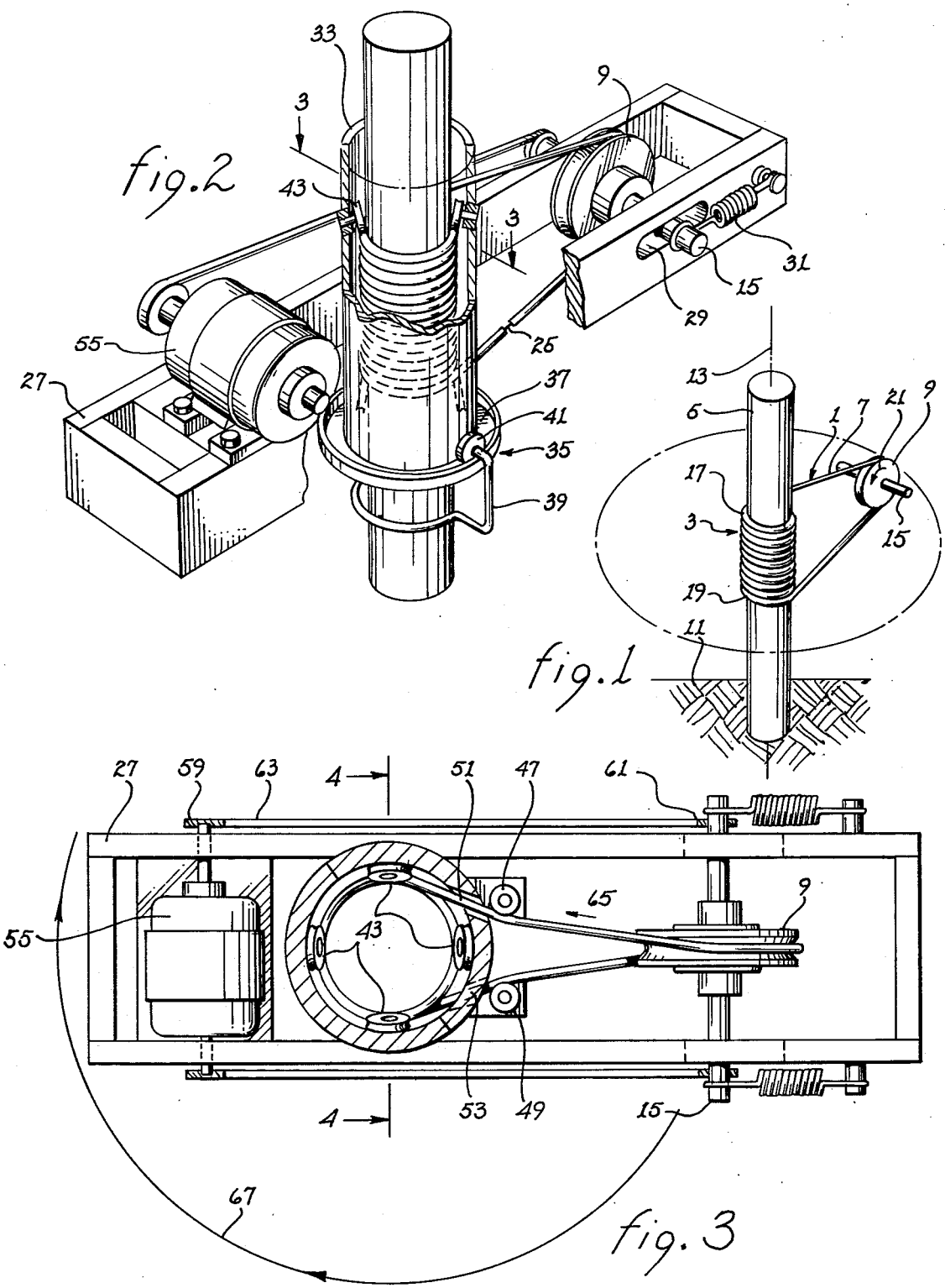

CONVEYER APPARATUS

BACKGROUND OF THE INVENTION

1. Field of the Invention

This invention relates to conveyer systems, and more particularly, to conveyer systems for producing translation along the longitudinal axis of a cylindrically shaped body.

2. Description of the Prior Art

Many different conveyer systems have been devised to accomplish the task of producing translation along the longitudinal axis of a cylindrically shaped body. The direction of the translation produced can either be in a horizontal plane or in a vertical plane. The more difficult task is presented when the conveyer system is required to produce translation longitudinally up and down a vertically oriented cylindrically shaped body, such as a flagpole or a tree. For systems producing vertical translation, the conveyor must not only lift its own weight, but must also lift the weight of the load which it is carrying. For these reasons, prior art conveyer systems contain very elaborate structural and mechanical arrangements to grip the cylindrical body and to provide vertical translation. Elaborate drive systems, including specially designed gears and transmissions, have been necessary to provide the required mechanical advantage so that a reasonably small engine can be used to propel the conveyer system vertically up and down.

The means of attaching prior art conveyer systems to vertically oriented, cylindrically shaped bodies has also presented substantial technical obstacles. Typically, these systems have utilized assorted combinations of metal wheels, rubber wheels, gears having a plurality of sharp teeth, tapered cylinders with sharp protruding spikes, and toothed chains. The cost of these prior art systems has been substantial since they must be designed to exert a high level of force on the periphery of the cylindrically shaped body in order to provide sufficient traction to prevent slippage in the vertical direction. This requirement dictated that a highly stressed frame member be provided which could withstand the necessary forces without itself becoming deformed.

Gear reduction systems which couple the power source to the translation-producing mechanism are typically of extremely sophisticated construction and utilize costly chains, toothed gears, worm gears or various other types of pulleys and shafts. The mechanical tolerances of the components located in the drive mechanism are critical, thereby substantially increasing the price of the conveyer system.

Virtually all relevant prior art conveyer systems also impart substantial structural damage to the pole or tree to which the conveyer is attached. Most prior art systems rely on actual mechanical penetration of the surfce of the cylindrically shaped body to prevent slippage. The use of this type of apparatus in a system where repeated up and down movements are required is unacceptable since eventually the extent of physical damage to the cylindrical body would be so substantial that it would no longer be able to support the conveyer system.

Another disadvantage of prior art conveyer systems is that they exert extremely high pressures upon the outer surface of the cylindrically shaped body. Because of this characteristic, the prior art conveyer systems can only be used with a cylindrically shaped body which is extremely strong and unyielding. Were the properties of the body otherwise, its surface would collapse due to the pressure.

A further disadvantage of prior art conveyer systems is that they can only be used with cylindrically shaped bodies having a narrow range of diameters. A conveyer system designed for use with a palm tree having a diameter of from one to two feet would not be adaptable for use with a flagpole having a three to six inch diameter.

Examples of the foregoing prior art conveyer systems are shown and described in U.S. Pat. Nos. 742,447 (Kidder), 1,299,289 (Berg), 957,473 (Olafson), 2,174,525 (Padernal), 3,520,383 (Loock), 2,654,638 (Elliott), 2,541,767 (Jones), and 2,612,724 (Llewellyn).

SUMMARY OF THE INVENTION

It is the principal object of the present invention to provide a conveyer for producing translation along the longitudinal axis of a cylindrically shaped body which non-destructively grips the outer surface of the body to produce the longitudinal translation.

Another object of the present invention is to provide a conveyer which distributes the gripping force over a relatively large surface area of the cylindrically shaped body.

It is still another object of the present invention to provide a conveyer apparatus which is readily adaptable for use with cylindrically shaped bodies of widely varying diameters.

Yet another object of the present invention is to provide a conveyer which can function either by rotational movement around a rigidly mounted cylindrical body or by remaining stationary while the cylindrical body rotates with respect to the conveyer.

A still further object of the present invention is to provide a conveyer which maintains a load connected thereto in a rotationally stationary position as the conveyer moves along the longitudinal axis of a cylindrical body.

Briefly stated, and in accord with one embodiment of the invention, a conveyer apparatus produces translation along the longitudinal axis of a cylindrically shaped body. An endless length of cable forms a tightly wrapped coil around the outer surface of the body, which cable includes a loop displaced away from the body. A support frame is mounted on the terminal windings of the coil and rotates about the longitudinal axis of the body. Loop support means is mounted on the frame and maintains the loop in a substantially constant position with respect to the coil. First means induces relative rotational motion between the loop and the body about the longitudinal axis of the body in order to wind the cable onto one end of the coil while simultaneously unwinding cable from the opposite end of the coil. Tension means is provided for maintaining the coil in tight contact with the body. In this manner the frame is conveyed along the longitudinal axis of the body.

DESCRIPTION OF THE DRAWING

The invention is pointed out with particularity in the appended claims. However, other objects and advantages, together with the operation of the invention, may be better understood by reference to the following detailed description taken in conjunction with the following illustrations wherein:

FIG. 1 is an incomplete depiction of the conveyer apparatus of the present invention and is used to illustrate the principle of operation thereof.

FIG. 2 is a perspective view, partially cut away, of the conveyer apparatus coupled to a cylindrically shaped body.

FIG. 3 is a view from above of the conveyer apparatus shown in FIG. 2, taken along section line 3—3.

DESCRIPTION OF THE PREFERRED EMBODIMENTS

Figure 4:
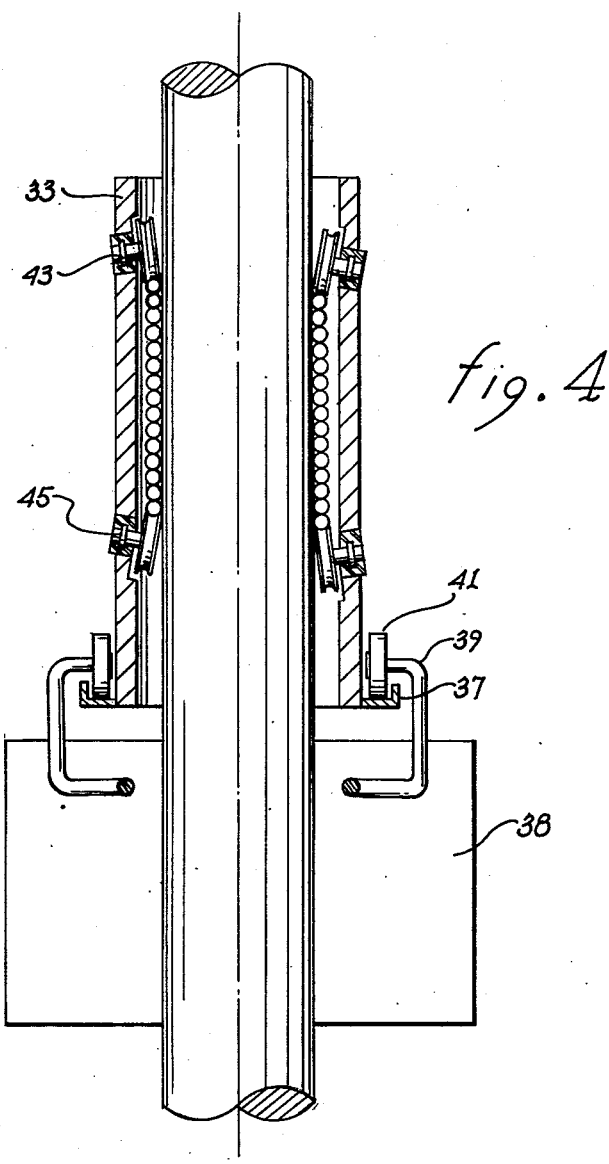
FIG. 4 is a sectional view of the conveyer apparatus shown in FIG. 3, taken along section line 4—4.

In order to better illustrate the advantages of the invention and its contributions to the art, the general operating principle of the conveyer apparatus will be described by referring to FIG. 1. Thereafter, the various mechanical features of the preferred embodiment disclosed in FIGS. 2 - 5 will be reviewed in detail. Finally, an alternative embodiment shown in FIG. 6 will be described.

FIG. 1 illustrates the principle of operation of the conveyer apparatus. An endless length of cable 1 forms a coil 3 around a cylindrically shaped body or pole 5. A loop 7 in cable 1 extends outwardly from pole 5 and passes around the outer periphery of a pulley 9. The base portion of pole 5 is rigidly attached to a surface 11. For the embodiment shown in FIG. 1, the longitudinal axis 13 of pole 5 is situated vertically with respect to base 11. Pulley 9 further includes a shaft 15, and coil 3 further includes a first end 17 and a second end 19. Pulley 9 is biased outwardly away from pole 5 so that cable 1 is maintained under tension at all times. A torque is applied through shaft 15 to pulley 9 in the direction shown by arrow 21. Since coil 3 is tightly wrapped around the outer surface of pole 5, the friction created therebetween will prevent the coil from slipping around the pole. Therefore, the torque exerted on puley 9 in the direction indicated by arrow 21 will cause loop 7 and pulley 9 to rotate in the direction indicated by arrow 23. The radius of rotation of pulley 9 will be constant and will result in increasing the length of coil 3 by wrapping further turns around end 17 while simultaneously decreasing the length of the opposite end 19 of coil 3 by unwrapping an equivalent number of turns. In this manner cable 1 is wrapped onto coil 3 at end 19 and is simultaneously unwrapped from coil 3 at end 19, producing an upward translation along the longitudinal axis 13 of pole 5 of the assembly consisting of endless cable 1 and pulley 19.

The preferrd embodiment of the conveyer is disclosed in FIGS. 2 - 4 and operates upon the same principle as that described with reference to FIG. 1. Support structure and numerous operational refinements have been added to the apparatus disclosed in FIG. 1.

At least one swivel connector 25 has been added to cable 1 so that twisting of the cable which takes place during its travel around coil 3 can be removed.

A rectangular support frame 27 surrounds coil 3. Shaft 15 of pulley 9 passes through a pair of oval shaped apertures, such as aperture 29. Pulley 9 is biased away from coil 3 by biasing means consisting of a pair of springs, such as spring 31, which are coupled between shaft 15 and support frame 27. The tension means which consists of pulley 9, shaft 15 and springs 31 thus exerts tension on cable 1 which maintains the windings of coil 3 in tight contact with the periphery of pole 5. In an alternative embodiment, the tension means could include an endless cable 1 of resilient composition which is maintained under tension by having shaft 15 of pulley 9 positioned rigidly along support frame 27.

A tubular body 33 is rigidly attached to support frame 27 and has an inner diameter slightly greater than the outer diameter of coil 3. The conveyer apparatus shown in FIGS. 2 - 4 is normally used to either raise or lower a load 38. Load support means 35 is provided to couple load 38 to the conveyer while simultaneously maintaining the load rotationally stationary with respect to pole 5. Load support means 35 consists of a cylindrical track 37 which is attached to the lower portion of tubular body 33. A load attachment bracket 39 is rotatably coupled to cylindrical track 37 by a pair of wheels, such as wheel 41. Due to the low-friction contact of wheel 41 with cylindrical track 37, load attachment bracket 39 remains in a stationary position with respect to pole 5 as support frame 27 rotates about the longitudinal axis 13 of pole 5.

Tubular body 33 is coupled to first end 17 of coil 3 by a plurality of pulleys, such as pulleys 43, which are rigidly mounted to tubular body 33 and which freely rotate about first end 17 of coil 3. Similarly, a second plurality of pulleys, such as pulleys 45, are rigidly coupled to tubular body 33 and freely rotate about second end 19 of coil 3. In this manner pulleys 43 and 45 rotatably couple tubular body 33 to coil 3. These pulleys furthermore serve to guide endless cable 1 into the proper position along coil 3 to provide the proper shaping therefor. Typically, four pulleys are used at both the first and second ends of coil 3, although it would be possible to use as few as from two to as many pulleys as will fit around the periphery of tubular body 33.

Pulley 47 is horizontally oriented and positioned near the upper end of coil 3 to assist in guiding cable 1 from pulley 9 onto coil 17. Similarly, pulley 49 is positioned at the lower end of tubular body 33 and serves to perform a similar function between cable 1 and second end 19 of coil 3. An aperture 51 is provided between pulley 47 and first end 17 to allow cable 1 to pass through tubular body 33. A second aperture 53 is provided between pulley 49 and second end 19 of coil 3 for a similar purpose.

A driving means or motor 55 is positioned on support frame 27 at an end opposite to that on which pulley 9 is located. Drive shaft 57 of motor 55 extends through both sides of support frame 27 where a pair of drive pulleys 59 are attached thereto. A second set of drive pulleys 61 are attached to the ends of shaft 15. A pair of drive belts 63 couple drive pulleys 59 to drive pulleys 61. In this manner the rotational torque produced by motor 55 is coupled to the periphery of pulley 9 and thereby to loop 7 of endless cable 1. Motion of cable 1 in the direction indicated by arrow 65 in FIG. 3 produces rotational movement of support frame 27 in the direction indicated by arrow 67. This rotational movement, in a manner similar to that discussed in relation to FIG. 1, produces a vertically ascending movement of the conveyer assembly along pole 5. Reversing the direction of rotation of motor 55 reverses the travel of the conveyer.

Figure 5:
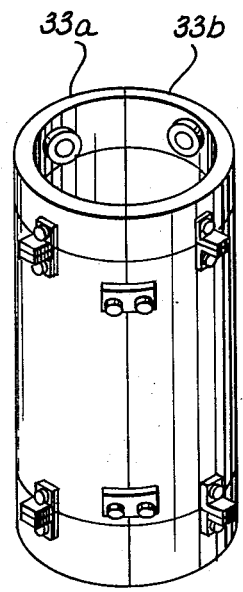
FIG. 5 is a perspective view of the tubular body which surrounds the coil of the conveyer apparatus.

FIG. 5 is a more detailed depiction of tubular body 33, particularly illustrating the construction of the guide pulleys, such as pulleys 43, and the fabrication of tubular body 33 in left half 33a and right half 33b.

Figure 6:
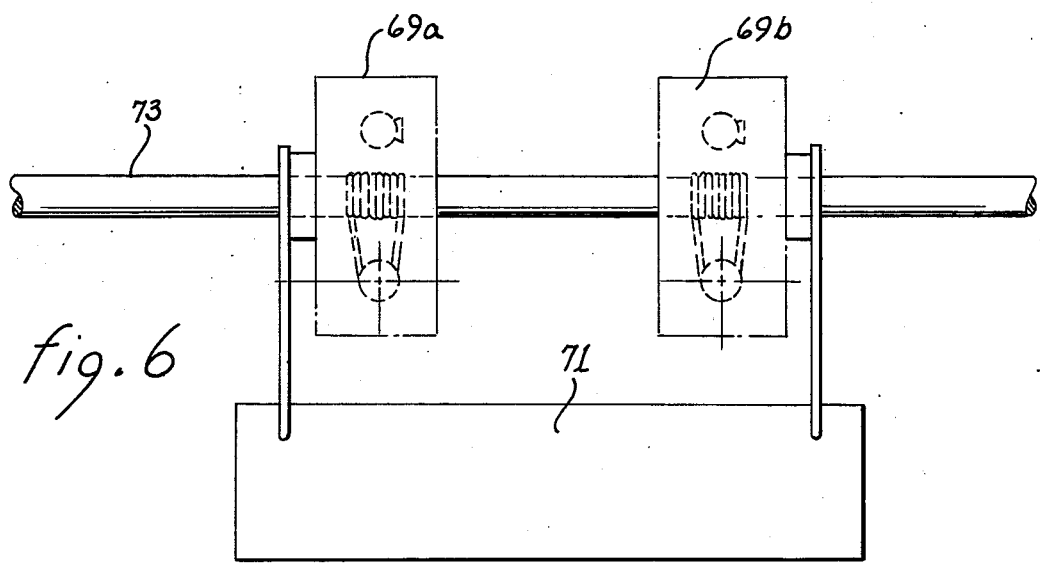
FIG. 6 is a generalized illustration of a conveyer apparatus having two driving elements for use in conveying a load in either a horizontal or a vertical direction.

FIG. 6 illustrates the connection of two separate conveyers, such as conveyer 69a and 69b, each of which is connected to one end of load 71 for providing translation of load 71 along the longitudinal axis of cable 73. It would be possible to provide a conveyer having the configuration shown in FIG. 6 to translate load 71 in a vertical direction. Using two conveyers 69a and 69b increases the load transporting abilities of the device and allows greater flexibility in the manner of connecting load 71.

Endless cable 1 can be fabricated from steel, rope, or a rubber coated cord. The conveyer apparatus can move along any generally cylindrically shaped body, such as a pole, column, rope, tree, or pipe. It has been found that the best load lifting performance is obtained when the length of coil 3 between first end 17 and second end 19 is approximately two times the diameter of cylindrical body 5 which it surrounds.

The rate of movement of the conveyer assembly along the longitudinal axis 13 of pole 5 can be varied by changing the speed of rotation of motor 55, by increasing or decreasing the diameter of pulley 9, by altering the diameter of cable 1 or by altering the diameter of cylindrcal body 5. The lifting capacity or grip strength of the conveyer apparatus can be altered by altering the number of turns of coil 3 around cylindrical body 5, by altering the spring tension provided by springs 31, by increasing the friction between coil 3 and the outer surface of cylindrical body 5 or by increasing the roughness of either the endless cable 1 or the outer surface of cylindrical body 5.

An additional embodiment of the conveyer apparatus can be provided by rotating pole 5 while maintaining support frame 27 stationary. Reversing the direction of rotation of cylindrical body 5 would cause the longitudinal direction of movement of the load to reverse direction.

It will be apparent to those skilled in the art that the disclosed conveyer apparatus may be modified in numerous ways and may assume various embodiments other than the preferred embodiment specifically set out and described above. Accordingly, it is intended by the appended claims to cover all such modifications of the invention which fall within the true spirit and scope of the invention.

What is claimed is:

1. A conveyer apparatus for producing translation along the longitudinal axis of a cylindrically shaped body, said apparatus comprising in combination:
   a. a body having a substantially circular cross-section and a longitudinal axis;
   b. an endless length of cable forming a coil around and in contact with said body, said coil having a first and a second end and said cable including a loop displaced from said body;
   c. a support frame mounted on the first and second ends of said coil and rotatable about the longitudinal axis of said body;
   d. loop support means mounted on said frame for maintaining said loop at a substantially constant radial distance from said coil;
   e. first means for inducing relative rotational motion between said loop and said body about the longitudinal axis of said body to wind said cable onto the first end of said coil while simultaneously unwinding cable from the second end of said coil; and
   f. tension means for maintaining said coil in tight contact with said body; whereby said frame is conveyed along the longitudinal axis of said body.

2. The apparatus of claim 1 further including:
   a. a load; and
   b. load support means for coupling said load to said frame and for maintaining said load rotationally stationary as said coil winds.

3. The apparatus of claim 1 wherein said tension means further includes a pulley for engaging the loop of said cable and biasing means for biasing said pulley against the loop in said cable, whereby said coil is maintained in tight contact with said body.

4. The apparatus of claim 3 further including:
   a. a load; and
   b. load support means for coupling said load to said frame and for maintaining said load rotationally stationary as said coil winds.

5. The apparatus of claim 4 wherein said pulley further includes a shaft passing through the central portion thereof and coupled to said support frame, and
   wherein said first means includes first driving means coupled to said pulley for rotating said pulley and thereby moving said cable.

6. The apparatus of claim 5 wherein said support frame includes a tubular body having a first and a second end and an inner diameter greater than the outer diameter of said coil, said tubular body mounted coaxial to said coil and including a first plurality of pulleys mounted around the inner circumference of the first end of said tubular body and rotatably coupled to the first end of said coil and a second plurality of pulleys mounted around the inner circumference of the second end of said tubular body and rotatably coupled to the second end of said coil, said first and second plurality of pulleys coupling said tubular body to said coil.

7. The apparatus of claim 4 wherein said pulley further includes a shaft passing through the central portion thereof and coupled to said support frame, and
   wherein said first means includes second driving means for rotating said body along its longitudinal axis and locking means for preventing rotation of said support frame as said body rotates while allowing said support frame to be conveyed along the longitudinal axis of said body.

8. The apparatus of claim 7 wherein said support frame includes a tubular body having a first and a second end and an inner diameter greater than the outer diameter of said coil, said tubular body mounted coaxial to said coil and including a first plurality of pulleys mounted around the inner circumference of the first end of said tubular body and rotatably coupled to the first end of said coil and a second plurality of pulleys mounted around the inner circumference of the second end of said tubular body and rotatably coupled to the second end of said coil, said first and said second plurality of pulleys coupling said tubular body to said coil.

9. The apparatus of claim 6 wherein said load support means further includes:
   a. a cylindrical track coupled to the second end of said tubular body;
   b. a plurality of wheels positioned within said cylindrical track; and
   c. a load attachment bracket attached to said load and to each of said wheels for rotatably coupling said load to said cylindrical track.

10. The apparatus of claim 8 wherein said load support means further includes:
   a. a cylindrical track coupled to the second end of said tubular body;
   b. a plurality of wheels positioned within said cylindrical track; and
   c. a load attachment bracket attached to said load and to each of said wheels for rotatably coupling said load to said cylindrical track.

* * * * *

UNITED STATES PATENT AND TRADEMARK OFFICE
CERTIFICATE OF CORRECTION

PATENT NO. : 4,060,149
DATED : November 29, 1977
INVENTOR(S) : James C. Henley

It is certified that error appears in the above-identified patent and that said Letters Patent are hereby corrected as shown below:

In the inventor's address, delete "85011", substitute --85040--.

In Column 1, line 56, delete "surfce", substitute --surface--.

In Column 3, line 41, delete "puley", substitute --pulley--.

Line 43, delete "23", substitute --21--.

Line 49, delete "19", substitute --17--.

Line 53, delete "19", substitute --9--.

Signed and Sealed this

Twenty-third Day of May 1978

[SEAL]

Attest:

RUTH C. MASON
Attesting Officer

LUTRELLE F. PARKER
Acting Commissioner of Patents and Trademarks